United States Patent
Menard et al.

(10) Patent No.: US 10,311,661 B2
(45) Date of Patent: Jun. 4, 2019

(54) DEVICE FOR CONTROLLING LOCKING/UNLOCKING AND/OR STARTING OF A VEHICLE

(71) Applicant: VALEO COMFORT AND DRIVING ASSISTANCE, Créteil (FR)

(72) Inventors: Eric Menard, Créteil (FR); Fabienne Masson, Créteil (FR); Eric Leconte, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/513,029

(22) PCT Filed: Sep. 21, 2015

(86) PCT No.: PCT/EP2015/071542
§ 371 (c)(1),
(2) Date: Mar. 21, 2017

(87) PCT Pub. No.: WO2016/046105
PCT Pub. Date: Mar. 31, 2016

(65) Prior Publication Data
US 2017/0236351 A1    Aug. 17, 2017

(30) Foreign Application Priority Data
Sep. 24, 2014  (FR) ...................... 14/02144

(51) Int. Cl.
*G07C 9/00* (2006.01)
*B60R 25/24* (2013.01)
(Continued)

(52) U.S. Cl.
CPC .......... *G07C 9/00309* (2013.01); *B60R 25/01* (2013.01); *B60R 25/209* (2013.01);
(Continued)

(58) Field of Classification Search
CPC ............ G07C 9/00309; G07C 9/00119; G07C 2009/00547; G07C 2209/63; H04W 4/008;
(Continued)

(56) References Cited

U.S. PATENT DOCUMENTS 8,930,045 B2 * 1/2015 Oman .................. G01S 13/765
340/426.36
9,274,786 B2 * 3/2016 Ji .......................... G01C 21/36
(Continued)

FOREIGN PATENT DOCUMENTS

| DE | 10 2005 062455 A1 | 7/2007 |
|---|---|---|
| GB | 2 496 755 A | 5/2013 |
| GB | 2 511 377 A | 9/2014 |

OTHER PUBLICATIONS

Partial English translation for DE102005062455; Hasch et al.; as provided by applicant; 13 pages.*
(Continued)

*Primary Examiner* — Brian E Miller
(74) *Attorney, Agent, or Firm* — Osha Liang LLP

(57) ABSTRACT

The present invention relates essentially to a device for controlling locking/unlocking and/or starting of a vehicle (V) comprising a first communication device (COM1) mounted in the vehicle (V), said first communication device (COM1) being linked to the control unit (ECU) of the vehicle (V), and a second communication device (COM2) disposed in a mobile apparatus (SP), the first communication device (COM1) and the second communication device (COM2) being able to communicate with one another according to a first mode of communication so as to carry out an authentication of the mobile apparatus (SP) by the vehicle (V), said authentication authorizing the locking/unlocking and/or starting of the vehicle (V), characterized in that the first communication device (COM1) and the second
(Continued)

communication device (COM2) are able to communicate also according to a second mode of communication, so as to determine data representative of the position of the mobile apparatus (SP) with respect to the vehicle (V), and in that the execution, by the control unit (ECU), of the command for locking/unlocking and/or starting the vehicle (V), is dependent on said data representative of the position of the mobile apparatus (SP) with respect to the vehicle (V).

11 Claims, 1 Drawing Sheet

(51) Int. Cl.
| | |
|---|---|
| *H04W 12/06* | (2009.01) |
| *G01S 13/02* | (2006.01) |
| *H04W 4/80* | (2018.01) |
| *B60R 25/01* | (2013.01) |
| *B60R 25/20* | (2013.01) |
| *H04B 1/69* | (2011.01) |
| *H04W 88/06* | (2009.01) |

(52) U.S. Cl.
CPC ............ *B60R 25/24* (2013.01); *B60R 25/241* (2013.01); *G01S 13/0209* (2013.01); *H04B 1/69* (2013.01); *H04W 4/80* (2018.02); *H04W 12/06* (2013.01); *B60R 2325/101* (2013.01); *G07C 9/00119* (2013.01); *G07C 2009/00547* (2013.01); *G07C 2209/63* (2013.01); *H04B 2201/70715* (2013.01); *H04W 88/06* (2013.01)

(58) Field of Classification Search
CPC .... H04W 12/06; H04W 88/06; B60R 25/209; B60R 25/01; B60R 25/241; H04B 1/69; H04B 2201/70715
See application file for complete search history.

(56) References Cited

U.S. PATENT DOCUMENTS

| | | | | |
|---|---|---|---|---|
| 9,294,603 | B2* | 3/2016 | Fischer | G07C 9/00119 |
| 9,544,853 | B1* | 1/2017 | Gu | H04W 52/0261 |
| 9,563,990 | B2* | 2/2017 | Khan | G07C 9/00309 |
| 2010/0152966 | A1* | 6/2010 | Tessier | B60R 25/245 |
| | | | | 701/36 |
| 2013/0143594 | A1* | 6/2013 | Ghabra | H04W 24/00 |
| | | | | 455/456.1 |
| 2013/0342379 | A1* | 12/2013 | Bauman | G01S 13/0209 |
| | | | | 342/21 |
| 2014/0210592 | A1* | 7/2014 | Van Wiemeersch | ......... |
| | | | | G07C 9/00309 |
| | | | | 340/5.61 |
| 2015/0363843 | A1* | 12/2015 | Loppatto | G06Q 10/083 |
| | | | | 705/330 |
| 2016/0272216 | A1* | 9/2016 | Kang | B60W 40/09 |

OTHER PUBLICATIONS

International Search Report issued in PCT/EP2015/071542 dated Dec. 1, 2015 (3 pages).
Written Opinion of the International Searching Authority issued in PCT/EP2015/071542 dated Dec. 1, 2015 (5 pages).

\* cited by examiner

DEVICE FOR CONTROLLING LOCKING/UNLOCKING AND/OR STARTING OF A VEHICLE

TECHNICAL FIELD

The technical field of the invention is that of motor vehicles, and more particularly that of vehicles which are accessed by means of a mobile apparatus. Thus the invention relates to a The term "mobile apparatus" is taken to mean any device enabling a person to access data and information, regardless of the location of this person. This category includes, notably, cellphones, and more particularly smartphones, portable computers, tablets, and personal digital assistants (or "PDAs").

TECHNICAL BACKGROUND OF THE INVENTION

At the present time, a user is able to control the execution of a function of a vehicle by means of a mobile apparatus, for example a smartphone. The function in question is, for example, one of the following functions: locking/unlocking the vehicle, starting the vehicle, automatic parking, etc. In some applications, in order to be able to execute one of these functions, the mobile apparatus must have previously stored an identification key authorizing the execution of at least one function of the vehicle. The identification key is stored in a secure element of the mobile apparatus, for example its SIM card. By keeping the mobile apparatus with him, the user can thus, for example, unlock the lock of an openable body section of the vehicle. For this purpose, data, notably authentication data contained in the identification key, are exchanged between the mobile apparatus and an electronic module of the vehicle, which determines whether the vehicle's identification key is valid. In advantageous embodiments, these data exchanges are carried out in accordance with the BLE (Bluetooth Low Energy) protocol.

For reasons of safety, the execution of a function of the vehicle is dependent on the location of the mobile apparatus with respect to the vehicle. The vehicle may be unlocked when the user, and therefore the mobile apparatus, are located near the vehicle, at a distance of about 50 cm. However, the user must still demonstrate his intention of unlocking the vehicle by actuating a handle of the vehicle to enable the vehicle's unlocking function to be executed. Similarly, the vehicle is locked, provided that the openable body sections are closed, when the user moves away from the vehicle, for example over a distance of more than one or two meters. It may therefore be assumed that the vehicle is locked while it is still in the field of view of the user, thus preventing any malicious intrusion when the user can no longer see his vehicle. Finally, for the purpose of starting the vehicle, the mobile apparatus must be inside the passenger compartment.

Various solutions are currently used to measure the distance between the mobile apparatus and the vehicle, for example measuring the power of a received signal whose initial power is known, enabling the distance between the transmitter and the receiver to be deduced. This method is known as "measurement by RSSI", an abbreviation for Received Signal Strength Indication in English. Another solution consists in measurement by GPS, or alternatively, for example in locations where GPS is not accessible, measurement using the data supplied by the gyroscopic and accelerometric sensors of the mobile apparatus. The mobile apparatus uses these data for calculating and recording the user's movements. This method is known as "true positioning" in English.

Measurements by RSSI and GPS are imprecise, with errors of the order of several meters, and therefore do not ensure compliance with the specifications for making the activation of the functions of the vehicle dependent on the position of the mobile apparatus with respect to the vehicle. Furthermore, it is desirable to operate without using the gyroscopic sensors and acceleration sensors of the mobile apparatus, thus avoiding the use of true positioning.

SUMMARY OF THE INVENTION

The device according to the invention proposes a solution to the problems outlined above.

For this purpose, the invention essentially proposes a device for controlling locking/unlocking and/or starting of a vehicle, comprising a first communication device fitted in the vehicle, said first communication device being connected to the vehicle's control unit, and a second communication device located in a mobile apparatus, the first communication device and the second communication device being capable of communicating with one another in a first communication mode so that an authentication of the mobile apparatus can be carried out by the vehicle, said authentication enabling the locking/unlocking and/or starting of the vehicle, characterized in that the first communication device and the second communication device are also capable of communicating in a second communication mode in order to determine data representative of the position of the mobile apparatus with respect to the vehicle, and in that the execution by the control unit of the command for locking/unlocking and/or for starting the vehicle is a function of the position of the mobile apparatus with respect to the vehicle.

The device according to the invention may have, in addition to the main characteristics mentioned in the preceding paragraph, one or more characteristics from among the following characteristics, considered individually or in all technically feasible combinations:

the first communication mode operates according to the Bluetooth Low Energy (BLE) protocol;
the second communication mode is of the Ultra Wide Band (UWB) type;
the second communication device comprises:
  a BLE communication module associated with an antenna acting as a BLE transmitter-receiver;
  a UWB communication module associated with an antenna acting as a UWB transmitter-receiver;
the second communication device comprises:
  a BLE communication module;
  a UWB communication module;
said BLE and UWB modules being associated with the same antenna, used both a BLE transmitter-receiver and a UWB transmitter-receiver;
the first communication device comprises:
  a BLE communication module associated with an antenna used as a BLE transmitter-receiver;
  a UWB communication module associated with an antenna used as a UWB transmitter-receiver;
the first communication device comprises:
  a BLE communication module;
  a UWB communication module;
said BLE and UWB modules being associated with the same antenna, used both a BLE transmitter-receiver and a UWB transmitter-receiver;

the first communication device comprises:
- a BLE communication module associated with an antenna used as a BLE transmitter-receiver;
- a main UWB communication module, associated with an antenna used as a UWB transmitter-receiver;
- said main UWB communication module also being associated with at least one secondary UWB communication module, associated with an antenna used as a UWB transmitter-receiver;

the first communication device comprises:
- a BLE communication module;
- a main UWB communication module;
- said main UWB communication module being associated with at least one secondary UWB communication module, associated with an antenna used as a UWB transmitter-receiver, the BLE module and the main UWB module being associated with the same antenna used as both a BLE transmitter-receiver and a UWB transmitter-receiver;
- said data representative of the position of the mobile apparatus with respect to the vehicle are obtained on the basis of the measurement of the travel time of the UWB signals exchanged between the UWB antenna associated with the UWB communication module of the first communication device positioned in the vehicle and the UWB antenna associated with the UWB communication module of the second communication device positioned in the mobile apparatus;
- said data representative of the position of the mobile apparatus with respect to the vehicle are obtained on the basis of the measurement of the travel time of the UWB signals exchanged between, on the one hand, the UWB antennas associated, respectively, with the main UWB communication module of the first communication device and with the secondary UWB communication modules positioned in the vehicle and the UWB antenna associated with the UWB communication module of the second communication device positioned in the mobile apparatus, and, on the other hand, on the basis of UWB exchange between the secondary UWB communication modules and the main UWB communication module;
- the processing for obtaining the data representative of the position of the mobile apparatus with respect to the vehicle is carried out in the vehicle;
- the processing for obtaining the data representative of the position of the mobile apparatus with respect to the vehicle is carried out in the mobile apparatus.

BRIEF DESCRIPTION OF THE DRAWINGS

The drawings are provided for information only and do not limit the invention in any way. The drawings show.

DETAILED DESCRIPTION

Figure 1:
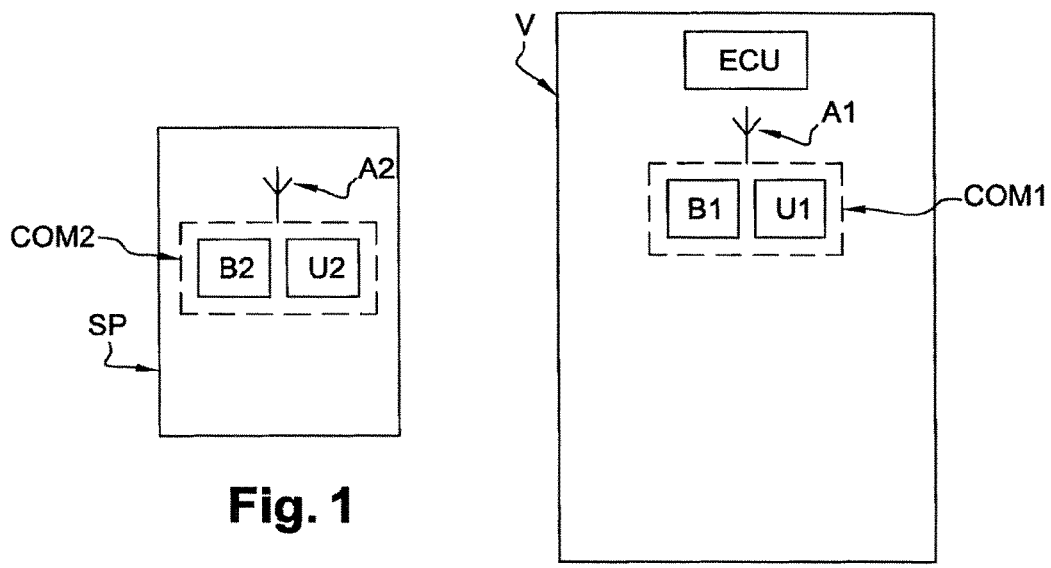
in FIG. 1, a schematic representation of a non-limiting embodiment of a device for controlling the locking/unlocking and/or starting of a vehicle.

The device for controlling the locking/unlocking and/or starting of a vehicle is described in FIG. 1 in a non-limiting embodiment.

In the remainder of the description, the device for controlling the locking/unlocking and/or starting of a vehicle is also called a control device.

The control device comprises a first communication device COM1 fitted in a vehicle V and a second communication device COM2 fitted in a mobile apparatus SP. The first communication device COM1 and the second communication device COM2 are, respectively, provided with communication modules B1, B2 capable of communicating with one another according to the Bluetooth Low Energy (BLE) communications protocol.

These communication modules B1, B2 communicate with one another, respectively, by means of the antennas A1 and A2 acting as a BLE transmitter-receiver. Thus it is possible to carry out an authentication of the mobile apparatus SP at the vehicle V, by successive exchanges between the communication module B1 of the first communication device COM1 and the communication module B2 of the second communication device COM2.

The authentication of the mobile apparatus SP at the vehicle V requires the preliminary storage of an identification key by the mobile apparatus SP. The authentication is then carried out by exchanges of data, notably authentication data contained in the identification key, between the first communication device COM1 and the second communication device COM2.

A user equipped with his mobile apparatus SP is then able, after the authentication of this apparatus at the vehicle V according to the BLE protocol, to execute functions of locking/unlocking and/or starting the vehicle V via a control unit ECU positioned in the vehicle. The control unit ECU and the communication device COM1 are preferably connected via the vehicle's network, which is, for example, of the LIN or CAN type.

Evidently, this first communication mode between the first communication device COM1 positioned in the vehicle V and the second communication device COM2 positioned in the mobile apparatus SP could be replaced by another radio is frequency communications protocol such as the WiFi, ZigBee®, or other protocol.

Additionally, in the context of Thatcham certification, well known to those skilled in the art, it is a requirement, in the case of a starting command for example, that this command should be actually executed only if the mobile apparatus S is located inside the passenger compartment, or not beyond a limit of 20 centimeters (cm) from the outside of the vehicle.

Ultra wide band (UWB), called "ultra large bande" (ULB) in French, is a radio modulation technique based on the transmission of pulses with a very short duration, commonly of less than a nanosecond. Thus very high values of bandwidth are achieved.

UWB may be used as a wireless communication technique which provides very high transfer rates over relatively short distances at low power.

UWB may also be used for positioning mobile objects. For this purpose, use is made of UWB beacons, on the basis of which the propagation time of signals between the mobile object and the beacons is evaluated, enabling the system to calculate the position of the mobile object by triangulation.

Present-day systems can achieve a precision of the order of 15 cm.

In order to obtain Thatcham certification, therefore, according to a first embodiment of the invention illustrated in FIG. 1, provision is made to equip the first communication device COM1 and the second communication device COM2 with the communication modules U1 and U2 respectively, operating in UWB.

Thus, and as mentioned above, it is possible, on the basis of the UWB communication modules U1 and U2, to determine with great precision the position of the mobile apparatus SP with respect to the vehicle V.

In an advantageous embodiment of the invention, the UWB communication modules U1, U2 communicate with one another, respectively, by means of the antennas A1 and A2 which also act as a BLE transmitter-receiver.

In an alternative embodiment which is not shown, provision is made to use antennas other than the BLE antennas A1, A2, which act specifically as a UWB transmitter-receiver for one of the UWB communication modules, preferably U1, positioned in the vehicle, or for the two UWB communication modules U1 and U2.

As specified by the UWB protocol, the positioning of the mobile apparatus SP with respect to the vehicle V is established on the basis of the evaluation of the propagation time of the UWB signals between the antenna A2 of the communication module U2 of the mobile apparatus SP and the antenna A1 of the communication module U1 of the vehicle.

In fact, the propagation time is translated into a distance between the communication module U2 of the mobile apparatus SP and the communication module U1 of the vehicle V, making it possible to define the area containing the mobile apparatus SP as being approximately the circle, with a radius equal to the distance d, centered on the antenna A1 of the communication module U1 of the vehicle V. The positioning calculations according to this method may be performed either at the vehicle V or, preferably, at the mobile apparatus SP.

Also advantageously, the antenna A1 of the communication module U1 of the vehicle V is located in the center of the passenger compartment.

According to a second embodiment of the invention, provision is made to use a plurality of UWB communication modules at the vehicle V, the measurement of distance to the mobile apparatus SP being obtained by triangulation.

Figure 2:
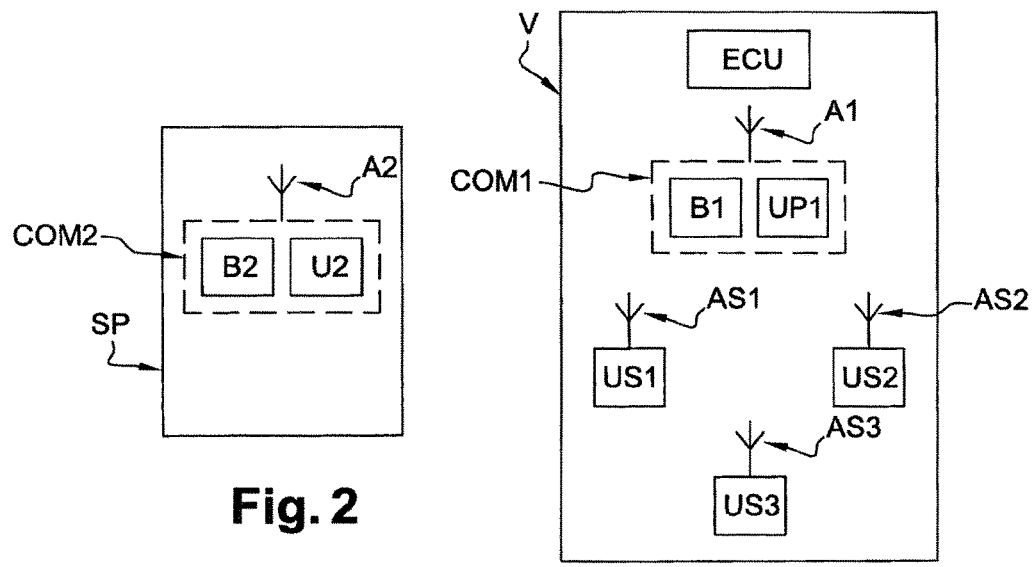
in FIG. 2, a schematic representation of a non-limiting embodiment of a positioning module.

In an advantageous embodiment shown in FIG. 2, the vehicle is equipped with:
  a main UWB communication module UP1, sharing the antenna A1 with the BLE module B1,
  a plurality of secondary UWB modules US1, US2, US3 which are independent, that is to say not directly connected to the vehicle's network, and have their own antennas AS2, AS2, AS3 acting as UWB transmitter-receivers.

In this embodiment, the propagation time of the UWB signals between, on the one hand, the antenna A1 of the main UWB communication module UP1 and the antenna A2 of the communication module U2 of the mobile apparatus SP, and, on the other hand, between each of the antennas AS1, AS2, AS3 of the secondary UWB communication modules US1, US2, US3 and the antenna A2 of the communication module U2 of the mobile apparatus SP is evaluated. The secondary UWB communication modules US1, US2, US3 also communicate with the main unit UP1 by UWB exchanges, in order to transmit their evaluation of the propagation time with respect to the mobile apparatus, and also to determine their relative positioning with respect to the main UWB communication module UP1, the set of values of is propagation times of the UWB signals being compiled in order to determine the positioning of the mobile apparatus SP with respect to the vehicle V on the basis of triangulation.

In another embodiment, a step of calibrating the positioning of the secondary UWB communication modules US1, US2, US3 with respect to the main UWB communication module UWB UP1 may be provided when the vehicle is first switched on. Thus, in the step of evaluating the positioning of the mobile apparatus SP, the secondary UWB communication modules US1, US2, US3 communicate only their evaluation of the propagation time with respect to the mobile apparatus SP.

Thus, as a result of the device according to the invention, and therefore as a result of the combination of the BLE and UWB communication protocols, it is possible to provide a precise assurance that the execution of a function of the vehicle V, such as locking/unlocking or starting, will take place when the mobile apparatus is located in the required position with respect to the vehicle V.

The invention claimed is:

1. A device for controlling locking/unlocking and/or starting of a vehicle, comprising:
   a first communication device fitted in the center of a passenger compartment of the vehicle, said first communication device being connected to a control unit of the vehicle; and
   a second communication device located in a mobile apparatus,
   the first communication device and the second communication device being configured to communicate with one another in a first communication mode so that an authentication of the mobile apparatus is carried out by the vehicle, said authentication enabling the locking/unlocking and/or starting of the vehicle,
   wherein the authentication of the mobile apparatus at the vehicle requires a preliminary storage of an identification key by the mobile apparatus,
   wherein the authentication of the mobile apparatus is carried out by exchanges of an authentic data contained in the identification key between the first communication device and the second communication device,
   wherein the first communication device and the second communication device are further configured to communicate in a second communication mode to determine data representative of the position of the mobile apparatus with respect to the vehicle,
   wherein the execution by the control unit of the command for locking/unlocking and/or for starting the vehicle is a function of the position of the mobile apparatus with respect to the vehicle, and
   wherein the first communication mode operates according to the Bluetooth Low Energy (BLE) protocol and the second communication mode is of the Ultra Wide Band (UWB) type.

2. The device as claimed in claim 1, wherein the second communication device comprises:
   a BLE communication module; and
   a UWB communication module,
   said BLE and UWB communication modules being associated with a same antenna, used as both a BLE transmitter-receiver and a UWB transmitter-receiver.

3. The device as claimed in claim 1, wherein the second communication device comprises:
   a BLE communication module associated with an antenna acting as a BLE transmitter-receiver; and
   a UWB communication module associated with an antenna acting as a UWB transmitter-receiver.

4. The device as claimed in claim 3, wherein the first communication device comprises:
   a BLE communication module associated with an antenna used as a BLE transmitter-receiver; and
   a UWB communication module associated with an antenna acting as a UWB transmitter-receiver.

5. The device as claimed in claim 4, wherein said data representative of the position of the mobile apparatus with respect to the vehicle are obtained on the basis of the measurement of the travel time of the UWB signals exchanged between the UWB antenna associated with the UWB communication module of the first communication device positioned in the vehicle and the UWB antenna associated with the UWB communication module of the second communication device positioned in the mobile apparatus.

6. The device as claimed in claim 5, wherein the processing for obtaining the data representative of the position of the mobile apparatus with respect to the vehicle is carried out in the vehicle.

7. The device as claimed in claim 5, wherein the processing for obtaining the data representative of the position of the mobile apparatus with respect to the vehicle is carried out in the mobile apparatus.

8. The device as claimed in claim 3, wherein the first communication device comprises:
 a BLE communication module; and
 a UWB communication module,
 said BLE and UWB communication modules being associated with the same antenna, used as both a BLE transmitter-receiver and a UWB transmitter-receiver.

9. The device as claimed in claim 3, wherein the first communication device comprises:
 a BLE communication module; and
 a main UWB communication module;
 said main UWB communication module being associated with at least one secondary UWB communication module, associated with an antenna used as a UWB transmitter-receiver, said BLE module and said main UWB module being associated with the same antenna used as both a BLE transmitter-receiver and a UWB transmitter-receiver.

10. The device as claimed in claim 3, wherein the first communication device comprises:
 a BLE communication module associated with an antenna used as a BLE transmitter-receiver; and
 a main UWB communication module associated with an antenna acting as a UWB transmitter-receiver,
 said main UWB communication module also being associated with at least one secondary UWB communication module, associated with an antenna used as a UWB transmitter-receiver.

11. The device as claimed in claim 10, wherein said data representative of the position of the mobile apparatus with respect to the vehicle are obtained on the basis of the measurement of the travel time of the UWB signals exchanged between the UWB antennas associated, respectively, with the main UWB communication module of the first communication device and with the secondary UWB communication modules positioned in the vehicle and the UWB antenna associated with the UWB communication module of the second communication device positioned in the mobile apparatus, and on the basis of UWB exchange between the secondary UWB communication modules and the main UWB communication module.

* * * * *